United States Patent [19]

Zölner et al.

[11] 4,442,525

[45] Apr. 10, 1984

[54] ELECTRODE FOR ARC FURNACES

[75] Inventors: Dieter H. Zöllner, Claremorris, Ireland; Friedrich Rittmann, Rückersdorf b. Nünberg, Fed. Rep. of Germany; Herbert Dung, Dortmund, Fed. Rep. of Germany; Johannes Haremsa, Herne, Fed. Rep. of Germany; Georg Bauer, Witten-Bommern, Fed. Rep. of Germany; Josef Otto; Josef Mühlenbeck, both of Wetter, Fed. Rep. of Germany; Inge Lauterbach-Dammler, Nuremberg, Fed. Rep. of Germany

[73] Assignee: Arc Technologies Systems Ltd., Cayman Island

[21] Appl. No.: 342,813

[22] Filed: Jan. 26, 1982

[51] Int. Cl.³ .............................................. H05B 7/08

[52] U.S. Cl. ...................................................... 373/93

[58] Field of Search ........................ 373/93, 91, 92, 90

[56] References Cited

U.S. PATENT DOCUMENTS

| | | | |
|---|---|---|---|
| 3,385,987 | 5/1968 | Wolf et al. | 373/93 |
| 4,145,564 | 3/1979 | Andrew et al. | 373/93 |
| 4,256,918 | 3/1981 | Schwabe et al. | 373/93 |
| 4,291,190 | 9/1981 | Elsner et al. | 373/93 |

*Primary Examiner*—Roy N. Envall, Jr.

*Attorney, Agent, or Firm*—Woodrow W. Ban; Bruce E. Harang; John P. Hazzard

[57] ABSTRACT

An arc furnace electrode for the production of electric steel, comprising a metallic top portion and a consumable, replaceable bottom portion threadably interconnected. The top portion is provided with coolant feed and return ducts and includes a protective covering. The protective covering is represented by a detachable surmounted sheath of electrically conductive heat resistant material. The sheath is subdivided into individual segments. The electrode includes internally disposed recesses advantageously accommodating elastic and electrically conductive materials especially advantageous properties.

30 Claims, 7 Drawing Figures

18 5 18 15 15 42 44 40 3 2 2 7 40 1 6

ELECTRODE FOR ARC FURNACES

BACKGROUND OF THE INVENTION

1. Field of the Invention

This invention relates to arc furnace electrodes having a top portion and a separate replaceable bottom portion of a consumable material, the portions being interconnected by means of a screw nipple or the like. The top portion is provided with a liquid cooling device having feed and return ducts. The top portion is provided with a protective covering.

2. Description of the Prior Art

Arc electrodes are known and are shown for example in Belgian Pat. No. 867 876. In such electrodes a metal shank, containing a cooling system, is covered by an externally disposed, substantially temperature resistant compound. This is evidently a continuous covering, adhesion to the metal shank is improved by hooks which are included in the metal shank.

British Pat. No. 1 223 162 shows electrodes in which the entire metallic shank is covered with a protective ceramic coating. The ceramic coating is applied as thinly as possible and penetrates into the metal shank to insulate a substantial portion of the tube extending therein. These tubes also provide cooling water ducting and an electrical conduit to the consumable electrode portion.

European Patent Application 79 302 809.3 describes an electrode in which a metallic contact of a metal shank, disposed laterally on the outside, is supported so as to be insulated with respect to an internally disposed cooling system. Bottom portions of the cooling shank is provided with a ceramic coating, secured by means of hooks, which extending approximately to the height of the screw nipple connection.

Electrodes for arc furnaces are exposed to severe stresses at least in part due to elevated or high operating temperatures, for example, in the production of electrosteel, where such electrodes are most frequently employed. Losses due to side oxidation occur as a result of the operating conditions within the furnace and by virtue of the arc which extends into the melt from the bottom electrode tip only in an ideal case. Lateral striking of the arc can also occur above the consumable portions of the electrode and can lead to short circuits. The electrodes are subjected to a temperature differential between zones of coolant feed and return as well as between the consumable part contrasted to the electrical current supplying and cooling portion. Substantial additional mechanical stresses occur when the electrodes enter the charge and as a result of the addition of scrap into the melt.

German Auslegeschrift No. 27 30 884 also describes electrodes for arc furnaces having a sheath mounted on an electrode support and containing liquid cooled metal components and including a core axially slidable within the sheath. The sheath mounted on the electrode support arm is defined with respect to the core, which slides therethrough, by an insulating stratum between the sheath and core. A device for generating a magnetic field is provided in the bottom part of the sheath. Such electrodes have different advantages, due on the one hand to a "chimney effect" which causes side burning, although somewhat reduced by contrast to conventional graphite electrodes. The temperature of the melt also acts over a longer region within such a sliding electrode so that the oxidation sensitivity of the consumable graphite portion is increased. Finally, the operation of such electrode requires a relatively large supply of energy.

German Auslegeschrift No. 28 45 367 also discloses liquid cooling retaining means for an electrode tip, wherein a heat shield comprising a metal tube is provided, electrically insulated with respect to the current carrying cooling system and cooled via a refractory compound which is rammed or case between the cooling system and the metal tube. The metal tube thus described is already known from German patent specification No. 807 312. Ramming or casting refractory compounds into the space between the metal tube and the cooling system in accordance with German Auslegeschrift No. 28 45 367 and results in a non-detachable connection having substantial disadvantages in the event of thermal shock or in connection with maintenance or repair work.

DISCLOSURE OF THE INVENTION

Owing to the high stresses imposed on the electrodes, these require constant improvement. Accordingly, it is the object of the invention to provide electrodes having a high degree of operational reliability; low electrical current and voltage loss characteristics in the supply means; low susceptibility to malfunctioning but being easy to manufacture and repair. In the event of undesirable shifting of the electric arc, and even in the event of partial damage, these electrodes should permit continuation of electrode operation in a manner which is improved over conventional electrodes.

This invention provides an electrode of the kind discussed priorly, characterised in that the protective covering is a detachably surmounted sheath of mechanically resistant material which is electrically conductive.

The insertion of a detachably surmounted sheath, formed of mechanically resistant materials, among other advantages, enables particularly rugged electrode types to be made available. More particularly, it has been found that adequate mechanical as well as thermal protection of an electrode top portion made of highly conductivity metal having a relatively low melting point is effected by provision of a detachably surmounted sheath which is mechanically resistant and electrically conductive. Hitherto, predominantly adopted methods of protecting the sensitive conductive metal shanks of combination electrodes, namely direct covering with an insulating, ceramic strata applied to the transition zone between the water-cooled metal shank and the active parts of graphite, were unable to withstand the special stresses which occur during operation of such electrodes, more particularly the alternating elevated thermal stresses, and more particularly thermal shock while at the same time maintaining mechanical ruggedness. A noticeable improvement is obtained by the choice of electrically conductive, mechanically rugged materials, which can be detachably surmounted.

Advantageous embodiments of the electrode according to the invention include segmenting the detachable surmounted sheath.

According to the invention it is possible to maintain the sheath at the electrical potential of the electrode. This can be achieved, for example by placing the sheath directly on the metal top portion, hereinafter also referred to as the metal shank, or by providing an electrically conductive connection to the latter. In this case, the sheath is conveniently constructed of a material with a high melting point and a high thermal stability so that the electrode also has some emergency running prooperties in the event of undesirable lateral arc striking. Conveniently materials may be employed having an electrical conductivity less than that of the metal shank suppling the current. The top portion of the electrode is therefore provided with a first, externally disposed, mechanically resistant, temperature resistant and high temperature resistant external sheath which is detachable surmounted. The sheath absorbs mechanical and thermal stresses which can occur in the production of electro-steel and therefore ensures continuity of the electrode process conducted using the internally disposed inner core which is connected to the current supply.

Alternatively it is possible for the sheath to be mounted electrically insulated with respect to the top portion. In such a sheath mounting, customarily the sheath is maintained at earth potential.

An insulating or electrically conductive connection between the sheath and the metal shank can be obtained by means of intermediate members or by spacers. Advantageously, such spacers are selected from temperature resistant materials. It can also be advantageous for such a material to have a poor thermal conductivity. The sheath can, however, also be supported by the metal shank via an intermediate stratum which is homogeneous or applied in raster configuration and does not involve a connection to the sheath which is non detachable or not readily detached. Depending on whether the sheath is to be maintained at electrode potential or at earth potential, the intermediate sheath can be electrically conductive, which is to be preferred, or it can be electrically insulating. The selection of resilient or springy intermediate strata has been found to be particularly advantageous as these are well able to withstand vibrations and other mechanical stresses of the electrode.

It is also possible to suspend the sheath from a sleeving or disc upon the top portion. On the other hand, constructions in which the inner core is connected to the outer sheath by one or more screwthreadings or by being constructed as the register member, have been found particularly suitable, since easy separation is possible in the event of repairs. If the sheath and the metal shank are constructed as register members, it is convenient to provide partial screwthreading for interconnection.

The sheath can also include a cooling system. Cooling slots or gas cooling or a liquid cooling circuit can be provided. When liquid cooling is employed, the sheath can be of a form of a jacket tube to which liquid is supplied and withdrawn. Supply and withdrawal of fluid can be obtained in suitable manner, for example by axial or spiral guiding of cooling ducts and the like. For example, the sheath can be a tube of high melting, high temperature resistant steel surrounding the top portion, through which cooling ducts extend, the steel tube being supported on the metal shank which preferably consists of copper.

It is particularly advantageous for the sheath to at least partially surround an end face of the top portion in order to protect the latter against direct attack by the electric arc and therefore protect against melting. The sheath portion extending around the end face can be in conductive contact with or alternately be situated at a slight distance from the consumable bottom portion which generally consists of graphite. By these means it is possible to ensure that in the event of lateral migration of the arc the arc strikes the external sheath but not the end face of the top portion. Where appropriate, an insulating insert, for example, a ceramic ring or the like can be provided for the sheath to afford additional protection for the end face of the top portion extending to the consumable portion of the electrode.

An intermediate stratum can also be advantageously provided between the sheath and the metal of the top portion. This intermediate stratum can be electrically conductive or electrically insulating, depending upon whether the externally disposed sheath is to be maintained at the electrical potential of the electrode or at earth potential. Preferably the sheath can be supported upon the metal shank via the intermediate stratum, either as a sole support or in addition to any upper retaining means or intermediate supporting members otherwise provided. The intermediate stratum can extend throughout the entire space between the sheath and the metal of the top portion or alternatively it can be provided only in regions of such space. At least partial filing of the space between sheath and metal refers not only to an application of the intermediate stratum in raster form, but with special advantage also refers to the continuous support of the sheath in regions of special stress. A particularly advantageous embodiment of the invention is addressesd to the provision of intermediate stratum materials having resilient or spring-like properties. Carbon fibres, carbon cords, graphite fibres or a combination thereof are possessed of such resilient or spring-like properties and provide an electrically conductive intermediate stratum.

It it is desirable for the intermediate stratum to be electrically insulating, it is possible to employ non-conductive ceramic fibres, glass fibres and the like for fabricating the intermediate stratum. Synthetic resins, which can ensure the resilient seating of the sheath on the metal shank of the combination electrode, equally preferably can be used as another advantageous material for the intermediate stratum. Synthetic resins suitable to this end are those which are used for the insulating parts of high voltage circuit breakers or as the base for printed circuits and the like. It is of course also possible to employ a combination of such materials depending on the kind of any intermediate sheath, the stress imposed on the electrode and the design thereof. For example, the use of high temperature resistant, conductive felt, or like composites of fibres and slivers, or fabrics is preferred, more particularly for uses in which the electrode is exposed to mechanical vibrations in operations where it is necessary for the externally disposed sheaths to be resiliently and electrically conductively supported to contribute to the additional stabilization of the electrode.

According to a particularly preferred embodiment of the invention, the sheath is formed from a plurality of elements, more particularly segments. These can comprise a series of tubular sections, half shells or the like, which surround at least the bottom region of the top portion of the electrode to a point adjacent the screw nipple and, where appropriate, there-beyond. The use of substantially tubular element or segments is particularly preferred. It can be advantageous for the individual segments to bear upon each other, so that in the event of fracture or failure of one of a lower segment, more upwardly disposed segments can slip down into the zone of special stress where failure has occurred. In such a case it is convenient to support merely the bottom or lowermost segment of the intermediate sheath on the metal shank or on retainers or on intermediate members, so that the segments disposed thereabove are freely movable.

In another embodiment of the electrode it is especialy preferred for the sheath to comprise segments, generally pipe-like sections, each individual segment being connected by means of scewthreading to the metal of the upper portion. In this way it is possible to achieve a particularly strong, easily detachable but nevertheless stable support of the segment on the metal of the top portion.

By this arrangement it is also possible to shift the segments and/or pipe sections of the sheath successively from below to above a corresponding screw motion. This has the purpose of moving upwards the lower segments under going stronger abrasion and which while already somwhat corroded, are still suitable for shielding the upper parts of the metal shaft, and to move from below to the lower part of the metal shaft segments and/or pipe sections which are new, or were formerly mounted on the upper part of the metal shaft. For this purpose, the simple requirement is that the sheath have a suitable construction. By means of this technique the advantage is produced that the pipe sections and/or segments of the sheath can be inserted for as long as possible and in a manner which is most economical in terms of use of material.

It is advantageous to profile the end faces of the segments or in some other manner to ensure that the segments cover the core well. This can be achieved by arranging for the end faces of the segments to engage with each other or for the latter to be profiled. More particularly, such profiling is intended to provide a labyrinth seal for the sheath.

According to a preferred embodiment of the invention the profiling of one segment end face includes at least one annular protuberance which engages with an annular groove associated with the end face of an adjacent segment. It has been found particularly convenient for the annular protuberance of the first segment as well as the annular groove of the adjacent segment have an approximately trapezoidal cross-section.

The individual segments are advantageously so constructed that recesses are produced on their internal surface particularly annular recesses. Materials of the electrically conductive or electrically insulating intermediate strata can be introduced into the annular recesses. Advantageously, carbon fibres or felts or cords, where appropriate in combination with graphite film, is introduced into such recesses so that the individual segments, connected to the core by means of screwthreading, are supported in a particularly resilient manner. In such embodiments it is particularly advantageous within the scope of the invention if the segments are formed of graphite. Such embodiments of the sheath according to the invention are illustrated in FIGS. 4 to 6 of the accompanying drawings, which are described hereinafter and to which special reference should be made.

For some purposes it is particularly advantageous if the carbon material which forms the sheath or the segment thereof is impregnated.

It is also possible for the sheath or the segments thereof to have a high temperature resistant coating.

According to the invention, in an electrode in which in the bottom region of the metal shank, to which the active parts adjoins, the sheath is subdivided into individual segments, more particularly of graphite, buffering being provided between the graphite segments and the metal shank by the insertion of conductive fabric or felt, is specially preferred. A refractory compound, for example applied by means of Torcreting, can adjoin the segments in the direction of the top part of the metal shank. Additional adhesion of the refractory compound can be obtained by the introduction of retaining means, for example hexagonal grid members positioned by welding. As a rule, steps are taken to ensure that the retaining means are also covered by the refractory stratum.

The construction of the protective covering in accordance with the invention achieves a number of advantages. In particular, a specially effective protection of the transition zone between the water cooled metal shank and the active part of graphite is thus achieved. The inventive construction of the sheath as a detachable moulding, which is electrically conductive and can be segmented meets the demands of alternating thermal stresses and mechanical loading, especially of vibration. Selecting electrically conductive materials of good mechanical stability, more particularly the design thereof and mounting on the metal shank, results, in a high degree of operational reliability and a long service life for the combination electrode. The separate construction of a detachably surmountable sheath, more particularly in positively engaged segmental form, especially of graphite, enables the fastening means on the metal shank to be situated in zones of lesser stress thus forestalling fracture of the sheath material, for example graphite, in this region, in the best possible manner.

BRIEF DESCRIPTION OF THE DRAWINGS

Some embodiments of the invention which are particularly preferred are illustrated in the accompanying drawings in which:

FIG. 2 is a longitudinal section through another embodiment of an electrode according to the invention;

DESCRIPTION OF THE PREFERRED EMBODIMENTS

Figure 1:
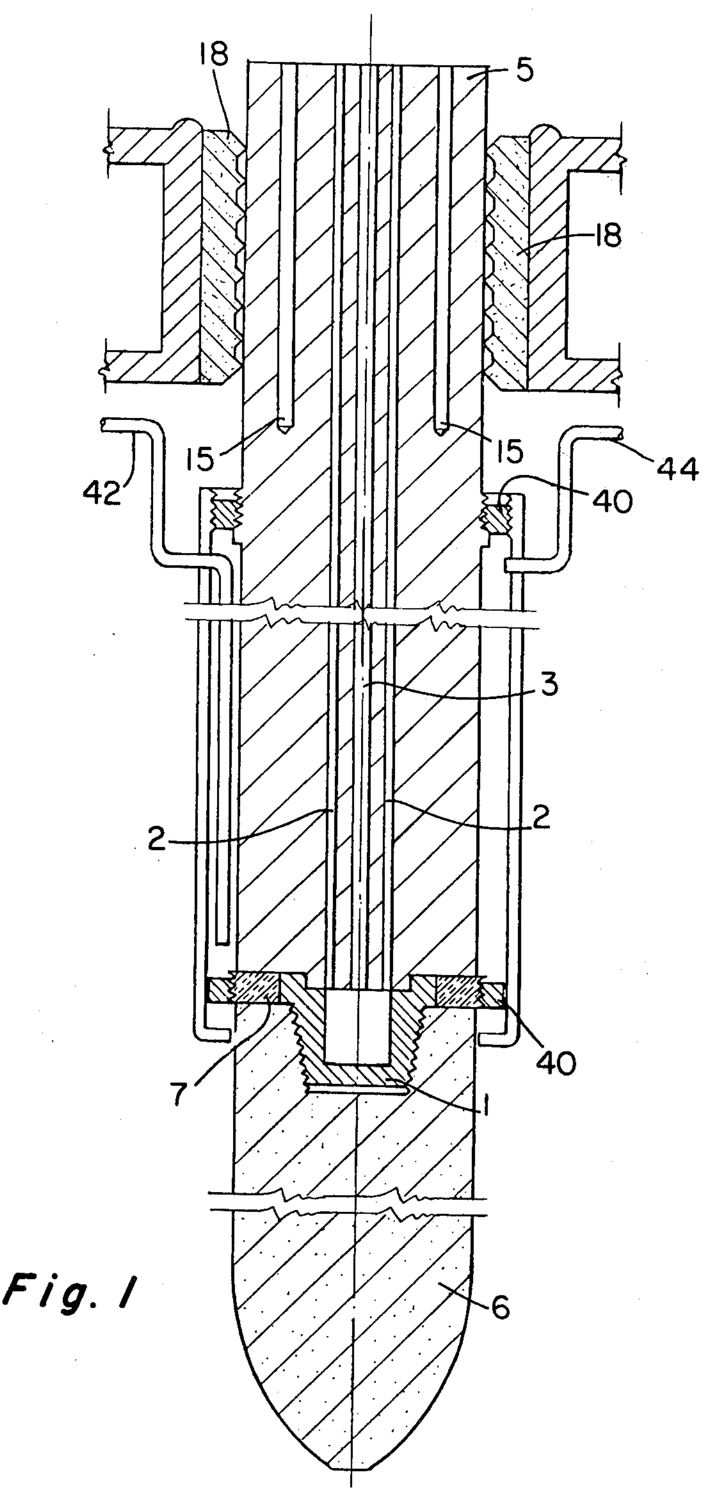
FIG. 1 is an elevational cross section of an electrode according to the invention.

In the electrode according to FIG. 1, the cooling medium, usually water, is supplied through the feed duct 2 and returned through the return duct 3. The cooling medium also enters into a chamber within the screw nipple 1. The top portion 5, usually of copper or some other high conductivity metal, is surrounded by a sheath 4 of annular construction which surrounds the bottom region of the metal shank at a distance therefrom. The sheath is screwmounted upon the metal shank by means of a screwthreaded disc 40. In the bottom region of the metal shank the sheath 4 is maintained at a distance by means of an intermediate member 7 to which a further screwthreaded disc 40 is joined. Jaws 18 provide for connection of the electrode to an electrical current supply means not in the top region of the metal shank and cooling bores 15, incorporated in the metal shank, are provided.

Optionally, the sheath may be cooled employing feed 42 and return 44 liquid coolant ducts. These ducts may be supplied with coolant independently of any liquid cooling of the metallic upper portion 5.

In FIG. 2, the sheath 4 is illustrated as a register member, beginning beneath the current supply means 18 and being additionally screwmounted in its top region by means of screwthreading to the internally disposed metal shank which includes the cooling ducts 2, 3. While a high conductivity metal, for example copper, is used for the internally disposed current carrying shank, it is possible to construct the protective external sheath of a mechanically very rugged material with a high melting point and good thermal stability, for example graphite, carbon, steel, refractories, and/or impregnated carbons. The electrical conductivity of the external sheath can be substantially lower than that of the internally disposed metal shank because the conductivity of the former is required merely for the purpose of emergency operating properties. According to the invention it is possible to introduce a buffering material such as felt, slivers of ceramic fibre or carbon or graphite film into the recess between the internally disposed metal shank and the externally disposed sheath, but this is not shown in FIG. 2.

Figure 3:
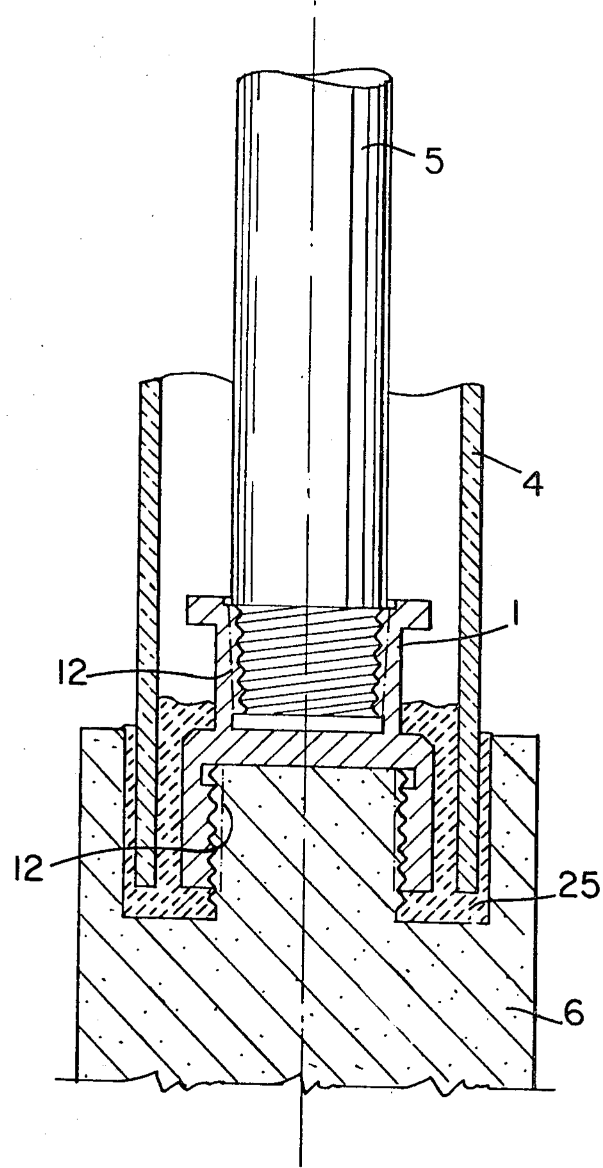
FIG. 3 is a longitudinal section in the transition zone of the electrode.

FIG. 3 shows a partial section in the region of the nipple connection between the metal shank 5 and the active part 6 and the appropriate screwthreading is provided with a coating 12 which increases the conductivity. The electrically conductive sheath 4 is again constructed as a tube is supported in a recess of the active part 6 in addition to have a fastening, not shown, on the shank 5. A suitable or conventional compound 25 such as refractory cement of high temperature stability, which can be electrically conductive or insulating, depending on the design of the electrode, is provided in the recess.

Figures 4, 5:
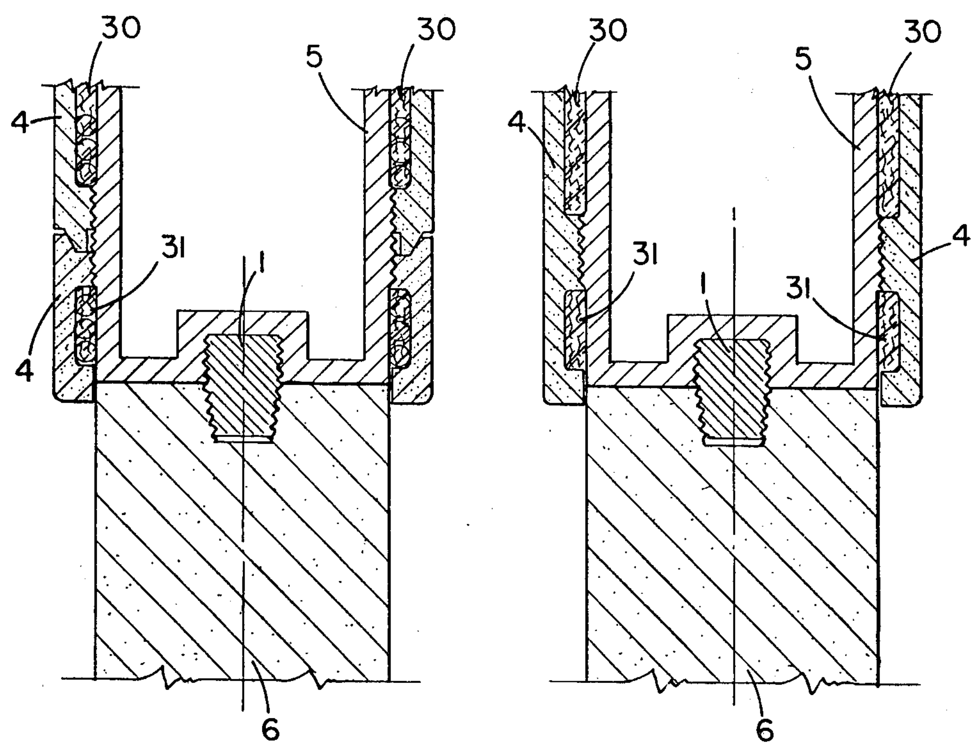
FIGS. 4 to 6 are partial longitudinal sections showing diagrammaticaly views of the segmental construction of the sheath.

FIG. 4 shows a particularly preferred embodiment of individual segments of the sheath 4. The individual segments are screwmounted by means of screwthreading to the external wall of the metal shank 5. At their end faces the segments are of trapezoidal construction and thus form a labyrinth seal. Carbon cords and carbon felts 26 are introduced into recesses on the internal surface of the segments. The construction of the sheath 4 or of the individual segments can vary.

FIG. 5 shows a segment screwmounted upon the metal shank 5 by means of a screwthreading disposed in the middle. Resilient or springy materials, for example glass fibres 26 or rubber rings 30 are inserted into recesses on the internal surface of the segments.

A graphite film 31 can be additionally provided.

Figure 6:
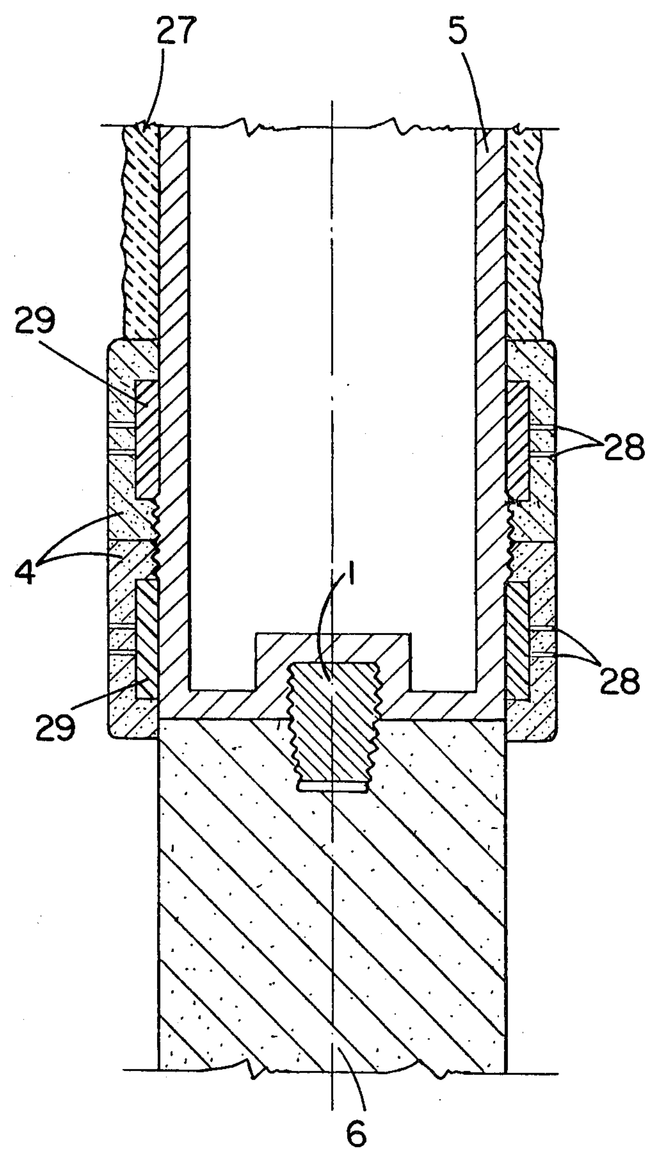

FIG. 6 again shows differently constructed profiles into the internal spaces of which for example via bores 28 it is possible for injected synthetic resin compounds to be introduced and to be cured in situ. A refractory compound is Torcreted on hexagonal mesh 27 in the top region of the metal shank.

Figure 7:
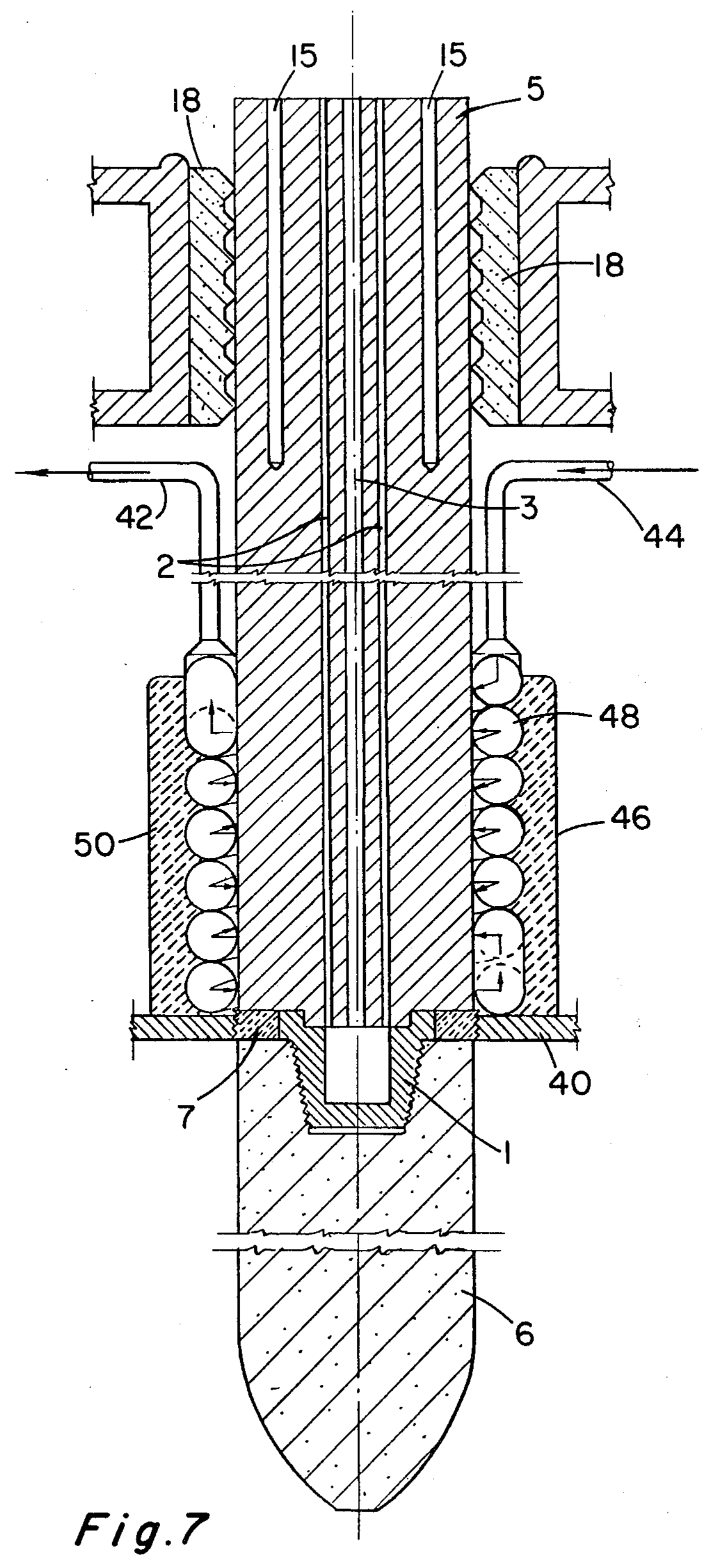
FIG. 7 depicts a lance in elevated cross sectional view similar to the lance of FIG. 1, but including a helical cooling coil.

Referring to the drawings, FIG. 7 depicts an electrode made in accordance with FIG. 1 but including a sheath 46 having a helically double wound cooling coil 48 inbedded in an insulating substance 50. Coolant ducts 42, 44 are provided for introducing and removing liquid coolant from the coil 48. The coil 48, is removable or detachable by disengagement of the sleeve 40.

Electrically conductive mechanically resistant material for the sheath can include particularly those materials with a high melting point and a high temperature stability but also with stability to alternating temperatures. The materials can be selected from steel with high temperature stability, metallides and especially their metal alloys. Carbides, nitrides or oxides of such metals can also be suitable in some case.

Graphite can also serve as "mechanically resistant" material in the sense of the invention more particularly where the graphite is impregnated and/or is specially conditioned to withstand mechanical stresses by the previously described special construction as individual segments and advantageously by means of use in conjunction with a resilient intermediate stratum but where appropriate also by corresponding dimensioning.

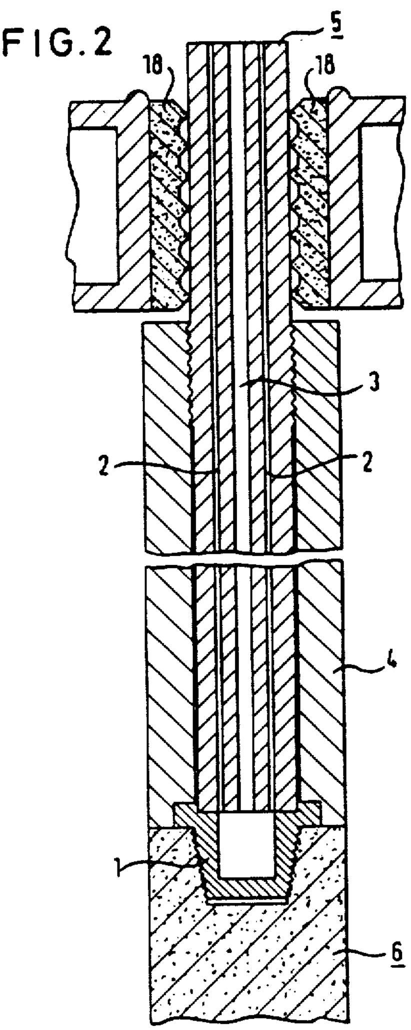

We claim:

1. An arc furnace electrode comprising a metallic top portion having a lower region, a consumable replaceable bottom portion, a threadable interconnection joining said top portion and said bottom portion, a liquid cooling means for cooling said top portion including a feed and a return duct, and a protective covering provided over at least a portion of the top portion particularly including said bottom region, said protective covering being constituted by a sheath of electrically conductive, mechanically resistant material detachably surmounted upon the top portion.

2. An electrode as set forth in claim 1, wherein said sheath is held at the electrical potential of said electrode.

3. An electrode as set forth in claim 1, wherein said sheath being mounted in electrically insulating relationship with respect to said top portion.

4. An electrode as set forth in claim 1, wherein said sheath is cooled.

5. An electrode as set forth in claim 4, wherein said sheath is provided with a cooling system comprising a feed duct and a return duct.

6. An electrode as set forth in claim 1, wherein said sheath is mounted on said top portion by means of intermediate members.

7. An electrode as set forth in claim 1, said sheath insulatingly engaging a sleeve defined upon the top portion.

8. An electrode as set forth in claim 5, wherein said cooling system for said sheath is independent of any cooling means for said top portion.

9. An electrode as set forth in claim 1, wherein said sheath comprises a moulding detachably mounted upon said top portion of said electrode.

10. An electrode as set forth in claim 6, said intermediate members being formed from a temperature-resistant material.

11. An electrode as set forth in claim 10, wherein said immediate members consist of material of poor thermal conductivity.

12. An electrode as set forth in claim 1, wherein said sheath comprises a surmounted, water-cooled tube.

13. An electrode as set forth in claim 1, wherein said sheath extends to partially surround bottom end face of said top portion.

14. An electrode as set forth in claim 13, wherein a portion of said sheath extending said end face is in electrically conductive physical contact with said bottom portion.

15. An electrode as set forth in claim 1, wherein said sheath comprises several segments.

16. An electrode as set forth in claim 3, wherein said sheath is separated from said bottom portion by an insulator.

17. An electrode as set forth in claim 16, wherein said insulator is a ceramic ring.

18. An electrode as set forth in claim 1, an intermediate stratum being disposed between said sheath and said top portion.

19. An electrode as set forth in claim 18, wherein said intermediate stratum is formed of resilient material.

20. An electrode as set forth in claim 19, wherein said intermediate stratum is formed of electrically conductive material.

21. An electrode as set forth in claim 1, wherein said sheath is connected to said top portion by means of screwthreading.

22. An electrode as set forth in claim 1, wherein said sheath is formed of a material selected from a group comprising a transition metal, steel, a metal alloy, a metal compound with a high melting point and high thermal stability, and carbon materials.

23. An electrode as set forth in claim 15, wherein said segments have end faces which are profiled.

24. An electrode as seth forth in claim 23, wherein the profiling of at least one end face of each of said segment comprises at least one annular protrusion for engaging with an annular groove defined by the profiling of an end face and an adjacent segment.

25. An electrode as set forth in claim 15, each of said segments having an internal surface defining at least one annular recess.

26. An electrode as set forth in claim 23, the profiling of each of said segments comprises an annular protrusion engaging an annular groove defined by the profiling of an adjacent segment and each said annular protrusion and each said annular groove being of approximately trapezoidal cross-section.

27. An electrode as set forth in claim 1, wherein said sheath includes a coating of high temperature stability.

28. An electrode as set forth in claim 15, a material selected from the group consisting of graphite, carbon cord, graphite film and combinations thereof being introduced between said segments and the metal of said top portion to form an intermediate layer.

29. An electrode as set forth in claim 15, wherein synthetic resin is introduced between said segments and the metal of said top portion.

30. An electrode as set forth in claim 15, wherein said protective covering comprises Torcreted refractory compound surrounding a top region of said top portion to which are adjoined segments of graphite surrounding lower regions of the top portion.

* * * * *

UNITED STATES PATENT AND TRADEMARK OFFICE

CERTIFICATE OF CORRECTION

PATENT NO. : 4,442,525

DATED : April 10, 1984

INVENTOR(S) : Zollner et al

It is certified that error appears in the above-identified patent and that said Letters Patent are hereby corrected as shown below:

In the Cover Page:

Left hand column, after "[22] Filed: Jan. 26, 1982" there should be inserted
--Foreign Application Priority Data
Jan. 28, 1981 [DE] Fed. Rep. of Germany 3102776--.

Signed and Sealed this

*Twenty-fifth* Day of *December 1984*

[SEAL]

*Attest:*

GERALD J. MOSSINGHOFF

*Attesting Officer*

*Commissioner of Patents and Trademarks*

UNITED STATES PATENT AND TRADEMARK OFFICE

CERTIFICATE OF CORRECTION

PATENT NO. : 4,442,525

DATED : April 10, 1984

INVENTOR(S) : Dieter H. Zollner et al.

It is certified that error appears in the above-identified patent and that said Letters Patent is hereby corrected as shown below:

Figure 2 should be added as shown on the attached sheet.

Signed and Sealed this

*Ninth* Day of *July 1985*

[SEAL]

*Attest:*

DONALD J. QUIGG

*Attesting Officer* *Acting Commissioner of Patents and Trademarks*

UNITED STATES PATENT AND TRADEMARK OFFICE
CERTIFICATE OF CORRECTION

PATENT NO. : 4,442,525
DATED : April 10, 1984
INVENTOR(S) : Zollner et al

It is certified that error appears in the above-identified patent and that said Letters Patent are hereby corrected as shown below: